US006596046B2

(12) United States Patent

Conrad et al.

(10) Patent No.: US 6,596,046 B2
(45) Date of Patent: Jul. 22, 2003

(54) CYCLONE SEPARATOR HAVING A VARIABLE LONGITUDINAL PROFILE

(75) Inventors: Wayne Ernest Conrad, Hampton (CA); Helmut Gerhard Conrad, Hampton (CA); Ted Szylowiec, Hampton (CA)

(73) Assignee: G.B.D. Corp. (KY)

( * ) Notice: Subject to any disclaimer, the term of this patent is extended or adjusted under 35 U.S.C. 154(b) by 0 days.

(21) Appl. No.: 09/883,977

(22) Filed: Jun. 20, 2001

(65) Prior Publication Data

US 2001/0042713 A1 Nov. 22, 2001

Related U.S. Application Data

(63) Continuation of application No. 09/136,366, filed on Aug. 19, 1998, now Pat. No. 6,277,278.

(51) Int. Cl.[7] ................................................ B01D 45/12

(52) U.S. Cl. .......................... 55/345; 55/428; 55/459.1; 55/DIG. 3; 210/512.1; 209/719

(58) Field of Search ............................. 210/512.1, 787, 210/788; 209/719; 55/345, 429, 459.1, 459.2, 459.3, 459.4, 459.5, DIG. 3, 428

(56) References Cited

U.S. PATENT DOCUMENTS

| | | | |
|---|---|---|---|
| 450,372 | A | 4/1891 | Morse |
| 883,413 | A | 3/1908 | Mahony |
| 1,023,082 | A | 4/1912 | Kluge |

(List continued on next page.)

FOREIGN PATENT DOCUMENTS

| | | |
|---|---|---|
| CA | 54488 | 5/1985 |
| CA | 2104136 | 6/1994 |
| CA | 2156069 | 6/1996 |
| DE | 260 776 | 11/1926 |
| DE | 1 251 139 | 9/1967 |
| DE | 34 35 214 | 4/1986 |
| DK | 52195 | 9/1936 |
| DK | 69708 | 1/1949 |
| EP | 0 408 862 A2 | 5/1990 |
| EP | 0 408 862 | 1/1991 |
| FR | 860 334 | 1/1941 |
| FR | 1 016 090 | 10/1952 |
| FR | 1 037 980 | 9/1953 |
| FR | 2 670 137 | 6/1992 |
| GB | 260 776 | 11/1926 |
| GB | 762070 | 12/1950 |
| GB | 2 108 013 | 5/1983 |
| NL | 6 400 783 | 8/1964 |
| SU | 148023 | 3/1961 |
| SU | 1042812 | 9/1983 |
| WO | 82 00451 | 1/1982 |
| WO | 82 00451 | 2/1982 |
| WO | 87 02275 | 4/1987 |
| WO | WO 96/19293 | 6/1996 |
| WO | WO 96/19294 | 6/1996 |
| WO | WO96/19936 | 7/1996 |
| WO | WO96/19937 | 7/1996 |
| WO | WO96/21389 | 7/1996 |
| WO | WO96/22726 | 8/1996 |
| WO | 96 27446 | 9/1996 |
| WO | WO96/02080 | 1/1998 |
| WO | WO98/10691 | 3/1998 |
| WO | WO98/23381 | 6/1998 |
| WO | WO98/27857 | 7/1998 |
| WO | WO98/33424 | 8/1998 |

OTHER PUBLICATIONS

PTO 2002–3288 which is a translation of DE 1251139 which issued on Sep. 28, 1967.*

International Search Report of PCT/CA99/00763 dated Nov. 11, 1999.

*Primary Examiner*—David A. Reifsnyder

(57) ABSTRACT

A cyclone separator having an improved efficiency to remove a broader spectrum of contained particles is disclosed. The inner wall of the cyclone separator is configured to continuously impart changes in the acceleration of a fluid as it rotates within the cyclone cavity.

5 Claims, 8 Drawing Sheets

U.S. PATENT DOCUMENTS

| | | | |
|---|---|---|---|
| 1,127,896 | A | 2/1915 | Keller |
| 1,369,939 | A | 3/1921 | Shaffer |
| 1,752,231 | A | 3/1930 | Clarkson |
| 1,798,510 | A | 3/1931 | Winslow et al. |
| 1,826,798 | A | 10/1931 | Lee |
| 1,897,144 | A | 2/1933 | Prouty |
| 2,014,287 | A | 10/1935 | Newman |
| 2,143,421 | A | 1/1939 | Loehr et al. |
| 2,171,248 | A | 9/1939 | Van Berkel |
| 2,392,872 | A | 1/1946 | Wolfe |
| 2,397,872 | A | 4/1946 | Kovacs |
| 2,397,980 | A | 4/1946 | Petri |
| 2,402,845 | A | 6/1946 | Rodman |
| 2,405,625 | A | 8/1946 | Whiton et al. |
| 2,608,268 | A | 8/1952 | Gerber |
| 2,681,124 | A | 6/1954 | Van der Kolk |
| 2,822,060 | A | 2/1958 | Udovich |
| 2,993,223 | A | 7/1961 | Krammes |
| 3,200,568 | A | 8/1965 | McNeil |
| 3,235,090 | A | 2/1966 | Bose et al. |
| 3,283,480 | A | 11/1966 | Szego |
| 3,320,727 | A | 5/1967 | Farley et al. |
| 3,425,192 | A | 2/1969 | Davis |
| 3,501,014 | A | 3/1970 | Fitch, Jr. et al. |
| 3,535,854 | A | 10/1970 | Taylor |
| 3,853,518 | A | 12/1974 | Tu et al. |
| 3,877,902 | A | 4/1975 | Eriksson et al. |
| 3,925,045 | A | 12/1975 | Cheng |
| 3,953,184 | A | 4/1976 | Stockford et al. |
| 3,955,236 | A | 5/1976 | Mekelburg |
| 4,005,998 | A | 2/1977 | Gorman |
| 4,141,698 | A | 2/1979 | Kihlstedt et al. |
| 4,162,149 | A | 7/1979 | Mekelburg |
| 4,198,290 | A | 4/1980 | Summers |
| 4,251,368 | A | 2/1981 | Colman et al. |
| 4,268,288 | A | 5/1981 | Coombs |
| 4,326,862 | A | 4/1982 | Suzuki |
| 4,345,572 | A | 8/1982 | Suzuki et al. |
| 4,352,681 | A | 10/1982 | Dietz |
| 4,373,228 | A | 2/1983 | Dyson |
| 4,377,882 | A | 3/1983 | Dyson |
| 4,390,426 | A | 6/1983 | Vicard |
| 4,398,928 | A | 8/1983 | Kunsagi |
| 4,443,234 | A | 4/1984 | Carlsson |
| 4,571,772 | A | 2/1986 | Dyson |
| 4,573,236 | A | 3/1986 | Dyson |
| 4,588,423 | A | 5/1986 | Gillingham et al. |
| 4,593,429 | A | 6/1986 | Dyson |
| RE32,257 | E | 10/1986 | Dyson |
| 4,643,748 | A | 2/1987 | Dyson |
| 4,756,729 | A | 7/1988 | Brunnmair et al. |
| 4,826,515 | A | 5/1989 | Dyson |
| 4,848,991 | A | 7/1989 | Bielefeldt |
| 4,853,008 | A | 8/1989 | Dyson |
| 4,853,011 | A | 8/1989 | Dyson |
| D305,269 | S | 12/1989 | Dyson |
| 5,062,870 | A | 11/1991 | Dyson |
| 5,078,761 | A | 1/1992 | Dyson |
| 5,090,976 | A | 2/1992 | Dyson |
| 5,101,532 | A | 4/1992 | Dyson et al. |
| 5,145,499 | A | 9/1992 | Dyson |
| 5,160,356 | A | 11/1992 | Dyson |
| 5,267,371 | A | 12/1993 | Soler et al. |
| D343,707 | S | 1/1994 | Dyson |
| 5,350,432 | A | 9/1994 | Lee |
| 5,558,697 | A | 9/1996 | Dyson et al. |
| 5,591,253 | A | 1/1997 | Altman et al. |
| D382,679 | S | 8/1997 | Dyson |
| 5,755,007 | A | 5/1998 | Dyson |

* cited by examiner

CYCLONE SEPARATOR HAVING A VARIABLE LONGITUDINAL PROFILE

This application is a continuation application of U.S. application Ser. No. 09/136,366 filed on Aug. 19, 1998 now U.S. Pat. No. 6,277,278.

FIELD OF THE INVENTION

This invention relates to an improved apparatus for separating a component from a fluid stream. In one embodiment, the fluid may be a gas having solid and/or liquid particles and/or a second gas suspended, mixed, or entrained therein and the separator is used to separate the particles and/or the second gas from the gas stream. In an alternate embodiment, the fluid may be a liquid which has solid particles, and/or a second liquid and/or a gas suspended, mixed, or entrained therein and the separator is used to remove the solid particles and/or the second liquid and/or the gas from the liquid stream. The improved separator may be used in various applications including vacuum cleaners, liquid/liquid separation, smoke stack scrubbers, pollution control devices, mist separators, an air inlet for a turbo machinery and as pre-treatment equipment in advance of a pump for a fluid (either a liquid, a gas or a mixture thereof) and other applications where it may be desirable to remove particulate or other material separable from a fluid in a cyclone separator.

BACKGROUND OF THE INVENTION

Cyclone separators are devices that utilize centrifugal forces and low pressure caused by spinning motion to separate materials of differing density, size and shape. FIG. 1 illustrates the operating principles in a typical cyclone separator (designated by reference numeral 10 in FIG. 1) which is in current use. The following is a description of the operating principles of cyclone separator 10 in terms of its application to removing entrained particles from a gas stream, such as may be used in a vacuum cleaner.

Cyclone separator 10 has an inlet pipe 12 and a main body comprising upper cylindrical portion 14 and lower frusto-conical portion 16. The particle laden gas stream is injected through inlet pipe 12 which is positioned tangentially to upper cylindrical portion 14. The shape of upper cylindrical portion 14. and frusto-conical portion 16 induces the gas stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the gas medium itself, reverses course at approximately collector G and pass outwardly through the low pressure centre of separator 10 and exit separator 10 via gas outlet 20 which is positioned in the upper portion of upper cylindrical portion 14.

The separation process in cyclones generally requires a steady flow free of fluctuations or short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the gas outlet diameter (C); the outlet duct length (D); the cone height (Lc); the dirt outlet diameter (G); and, the cylinder height (L)

The value $d_{50}$ represents the smallest diameter particle of which 50 percent is removed by the cyclone. Current cyclones have a limitation that the geometry controls the particle removal efficiency for a given particle diameter. The dimensions which may be varied to alter the $d_{50}$ value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Typically, the particles which are suspended or entrained in a gas stream are not homogeneous in their particle size distribution. The fact that particle sizes take on a spectrum of values often necessitates that a plurality of cyclonic separators be used in a series. For example, the first cyclonic separator in a series may have a large $d_{50}$ specification followed by one with a smaller $d_{50}$ specification. The prior art does not disclose any method by which a single cyclone may be tuned over the range of possible $d_{50}$ values.

An example of the current limitation in cyclonic separator design is that which has been recently applied to vacuum cleaner designs. In U.S. Pat. Nos. 4,373,228; 4,571,772; 4,573,236; 4,593,429; 4,643,748; 4,826,515; 4,853,008; 4,853,011; 5,062,870; 5,078,761; 5,090,976; 5,145,499; 5,160,356; 5,255,411; 5,358,290; 5,558,697; and RE 32,257, a novel approach to vacuum cleaner design is taught in which sequential cyclones are utilized as the filtration medium for a vacuum cleaner. Pursuant to the teaching of these patents, the first sequential cyclone is designed to be of a lower efficiency to remove only the larger particles which are entrained in an air stream. The smaller particles remain entrained in the gas stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the cyclone separator but exit the frusto-conical cyclone with the gas stream.

Accordingly, the use of a plurality of cyclone separators in a series is documented in the art. It is also known how to design a series of separators to remove entrained or suspended material from a fluid stream. Such an approach has two problems. First, it requires a plurality of separators. This requires additional space to house all of the separators and, secondly additional material costs in producing each of the separators. The second problem is that if any of the larger material is not removed prior to the fluid stream entering the next cyclone separator, the subsequent cyclone separator typically will allow such material to pass therethrough as it is only designed to remove smaller particles from the fluid stream.

SUMMARY OF THE PRESENT INVENTION

In accordance with one embodiment of the instant invention, there is provided a non-frusto-conical cyclone separator comprising a longitudinally extending body having a wall, the wall having an inner surface and defining an internal cavity within which a fluid rotates when the separator is in use, at least a portion of the inner surface of the wall configured to continuously impart changes in the rate of acceleration to the fluid as it rotates within the cavity.

In accordance with another embodiment of the present invention, there is provided a non-frusto-conical cyclone separator comprising a longitudinally extending body having a longitudinally extending axis and a wall, the wall having an inner surface and defining an internal cavity within which a fluid rotates when the separator is in use, at least a portion of the inner surface of the wall is defined by a plurality of straight lines which approximate a continuous n-differentiable curve swept 360 degrees around the axis wherein $n \geqq 2$ and the second derivative is not zero everywhere.

In accordance with another embodiment of the present invention, there is provided a non-frusto-conical cyclone separator comprising a longitudinally extending body having a longitudinally extending axis and a wall, the wall having an inner surface and defining an internal cavity within which a fluid rotates when the separator is in use, at least a portion of the inner surface of the wall defined by a continuous n-differentiable curve swept 360 degrees around the axis wherein $n \geqq 2$ and the second derivative is not zero everywhere.

Preferably, $n \leqq 1{,}000$, more preferably $n \leqq 100$ and most preferably $n \leqq 10$. The second derivative may be zero at a finite number of points and, preferably the second derivative is zero at from 2 to 100 points, more preferably 2 to 30 points and most preferably 2 to 10 points.

In one embodiment, the inner surface of the separator is continuous in the longitudinal direction.

In another embodiment, the inner surface of the wall is defined by a plurality of straight lines and preferably by 3 or more straight lines.

In another embodiment, the fluid is directed to rotate around the inner wall when the fluid enters the separator.

The fluid which is introduced into the cyclone may comprise a gas which has a material selected from the group consisting of solid particles, a liquid, a second gas and a mixture thereof contained therein and a portion of the material is removed from the gas as the gas passes through the separator.

The fluid which is introduced into the cyclone may comprise a liquid which has a material selected from the group consisting of solid particles, a second liquid, a gas and a mixture thereof contained therein and a portion of the material is removed from the liquid as the liquid passes through the separator.

The fluid which is introduced into the cyclone may comprise at least two fluids having different densities and the inner wall includes at least a portion which is configured to decrease the rate of acceleration (i.e. increase the rate of deceleration) of the fluid as it passes through that portion of the separator.

In another embodiment, the separator comprises a dirt filter for a vacuum cleaner.

The separator may have a collecting chamber in which the separated material is collected. Alternately, the separator may have a separated material outlet which is in flow communication with a collecting chamber in which the separated material is collected.

By designing a cyclone separator according to the instant invention, the parameters L/d and Lc/d may vary continuously and differentiably along the length of the cyclone axis. Thus, a cyclone may be designed which will have a good separation efficiency over a wider range of particle sizes than has heretofore been known. Accordingly, one advantage of the present invention is that a smaller number of cyclones may be employed in a particular application than have been used in the past. It will be appreciated by those skilled in the art that where, heretofore, two or more cyclones might have been required for a particular application, that only one cyclone may be required. Further, whereas in the past three to four cyclones may have been required, by using the separator of the instant intention, only two cyclones may be required. Thus, in one embodiment of the instant invention, the cyclone separator may be designed for a vacuum cleaner and may in fact comprise only a single cyclone as opposed to a multi-stage cyclone as is known in the art.

DESCRIPTION OF THE DRAWING FIGURES

These and other advantages of the instant invention will be more fully and completely understood in accordance with the following description of the preferred embodiments of the invention in which.

Figure 3:
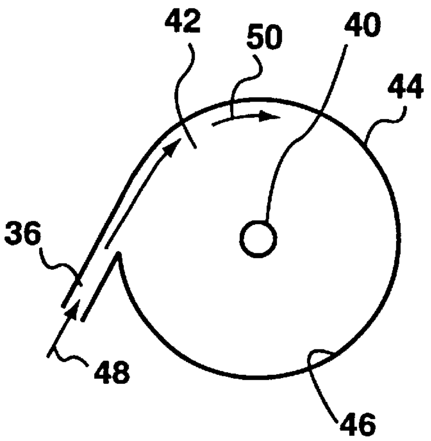
FIG. 3 is a cross-section of the cyclone separator of FIG. 2 taken along the line 3—3.
Figure 1:
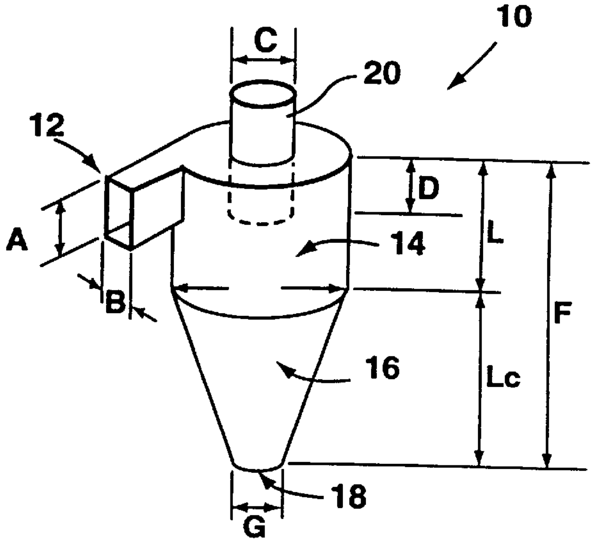
FIG. 1 PRIOR ART
FIG. 1 is a cyclone separator as is known in the art.
Figure 6:
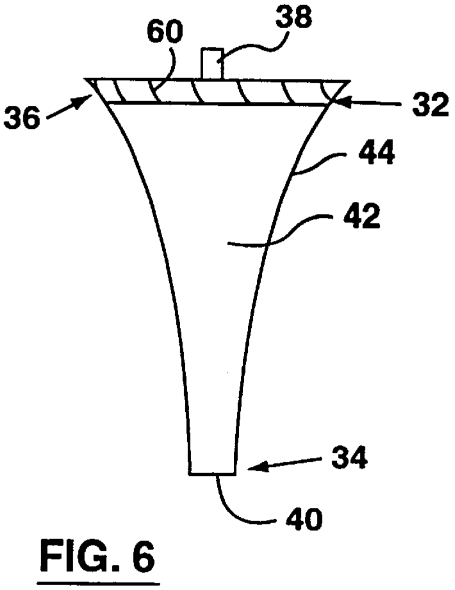
Figure 2:
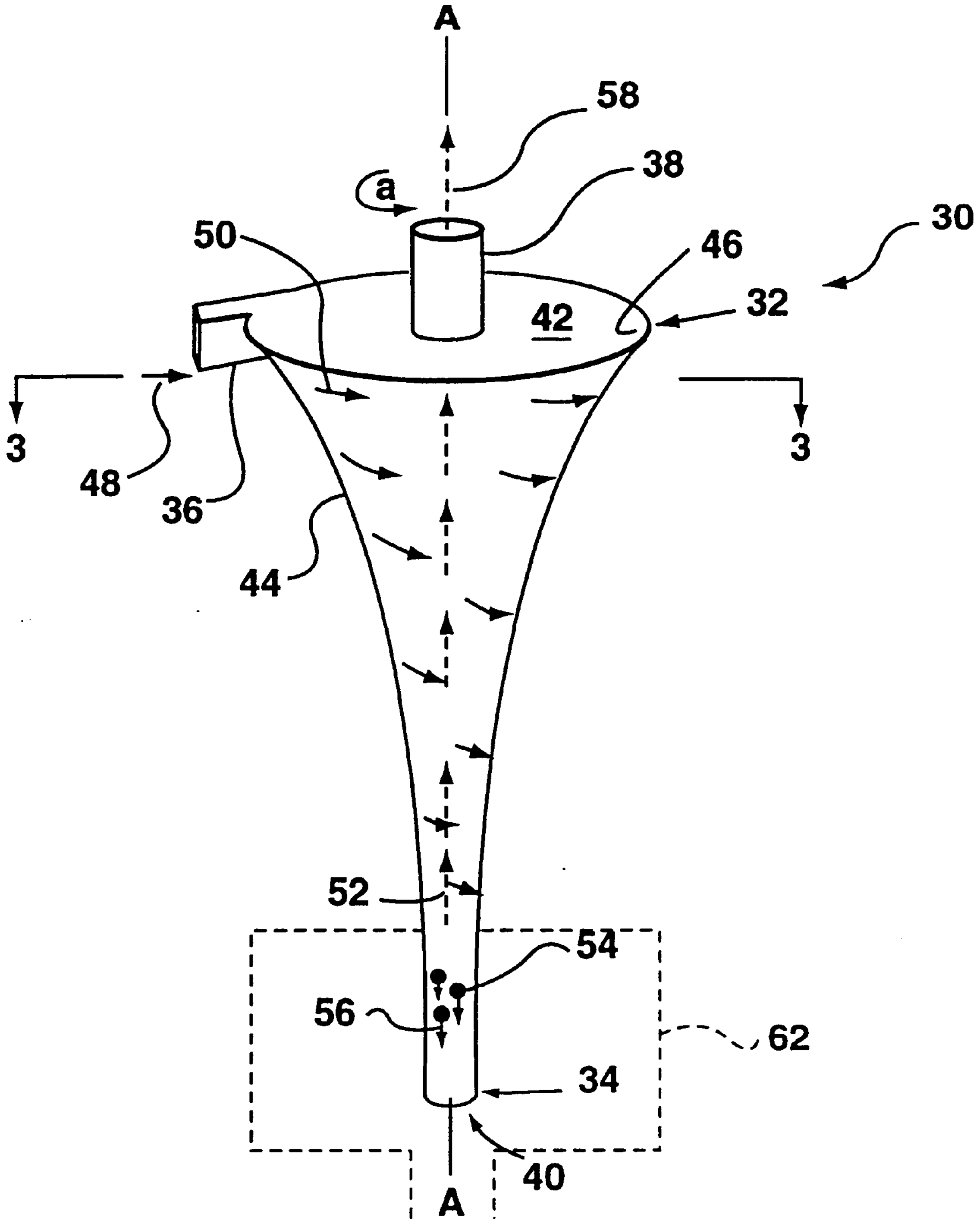
FIG. 2 is a perspective view of a cyclone separator according to the instant invention.
Figure 4:
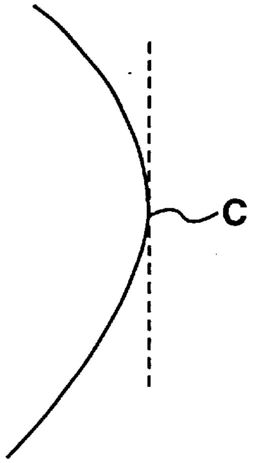
Figure 4:
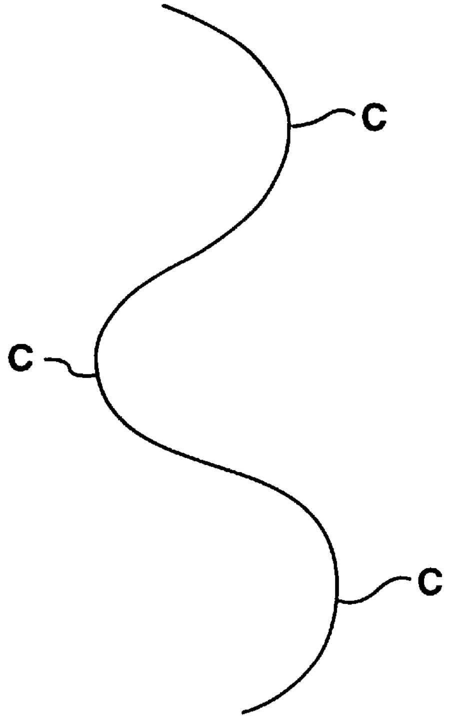
Figure 4:
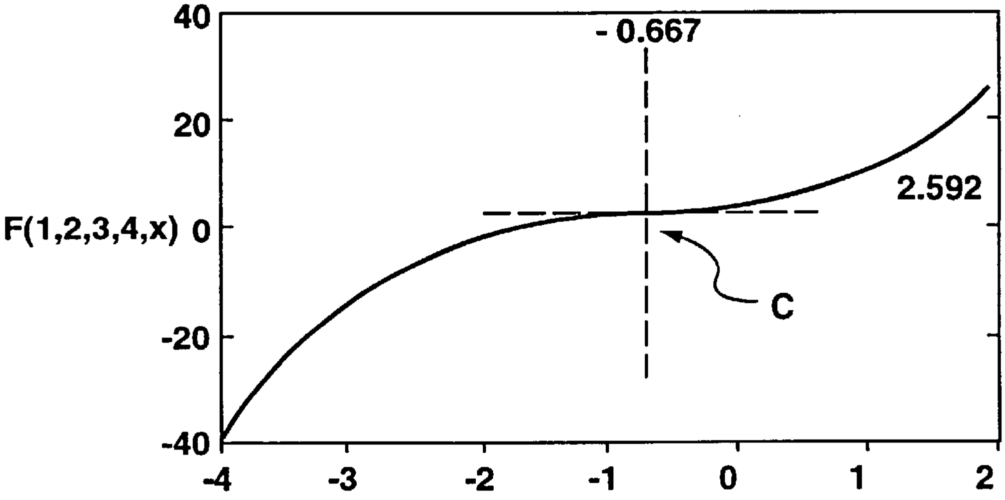
Figure 5:
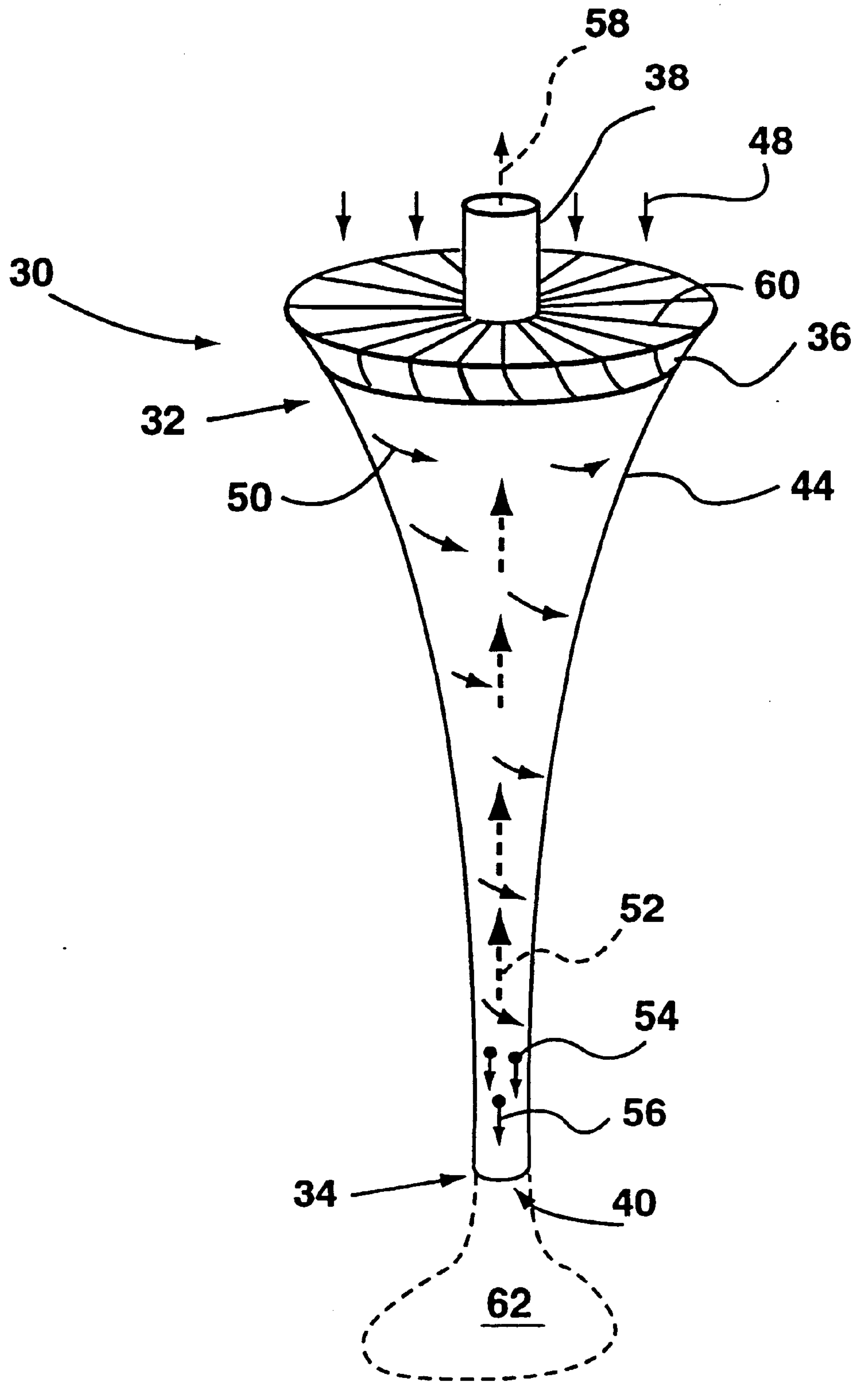
Figure 7:
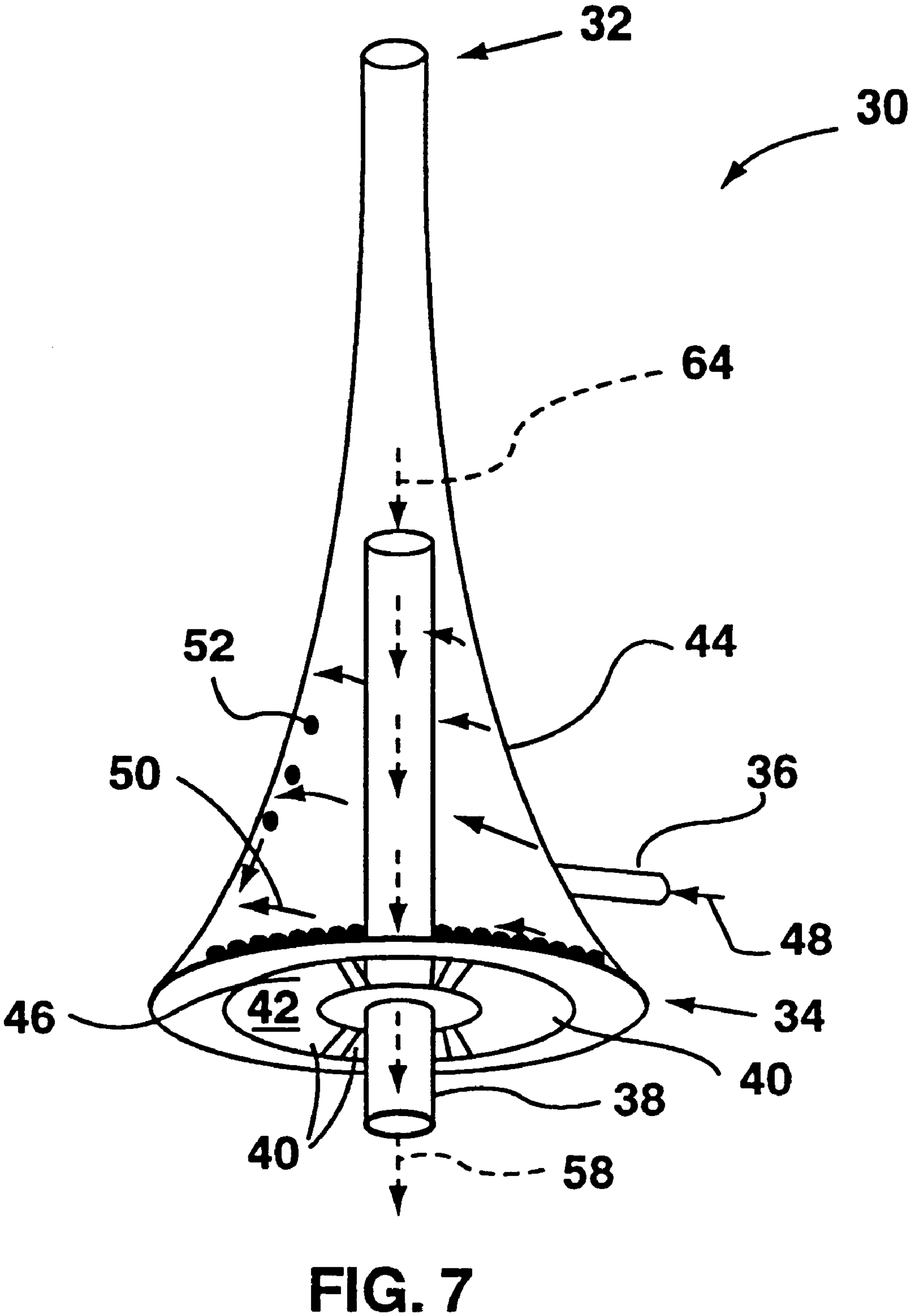
Figure 8:
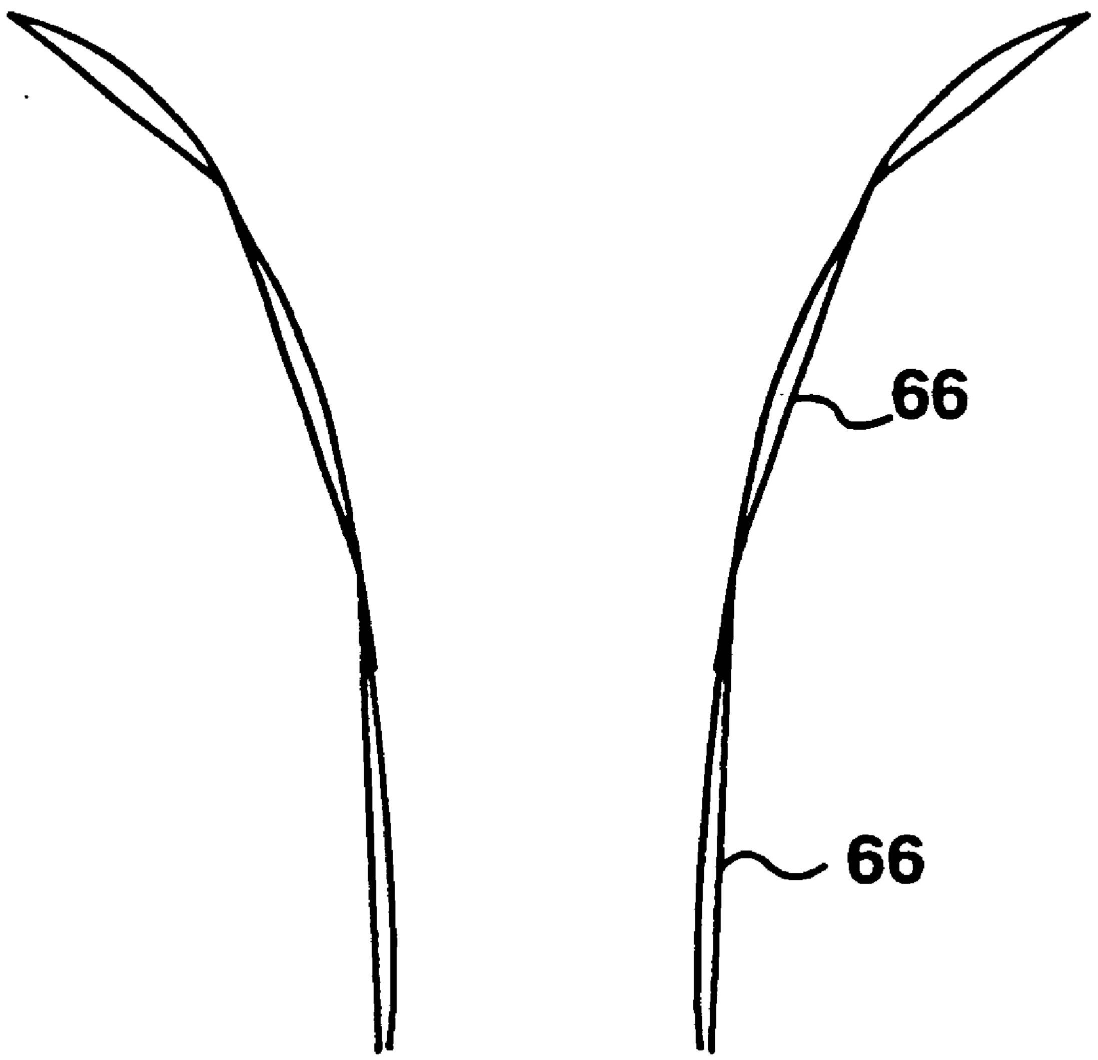
Figure 9:
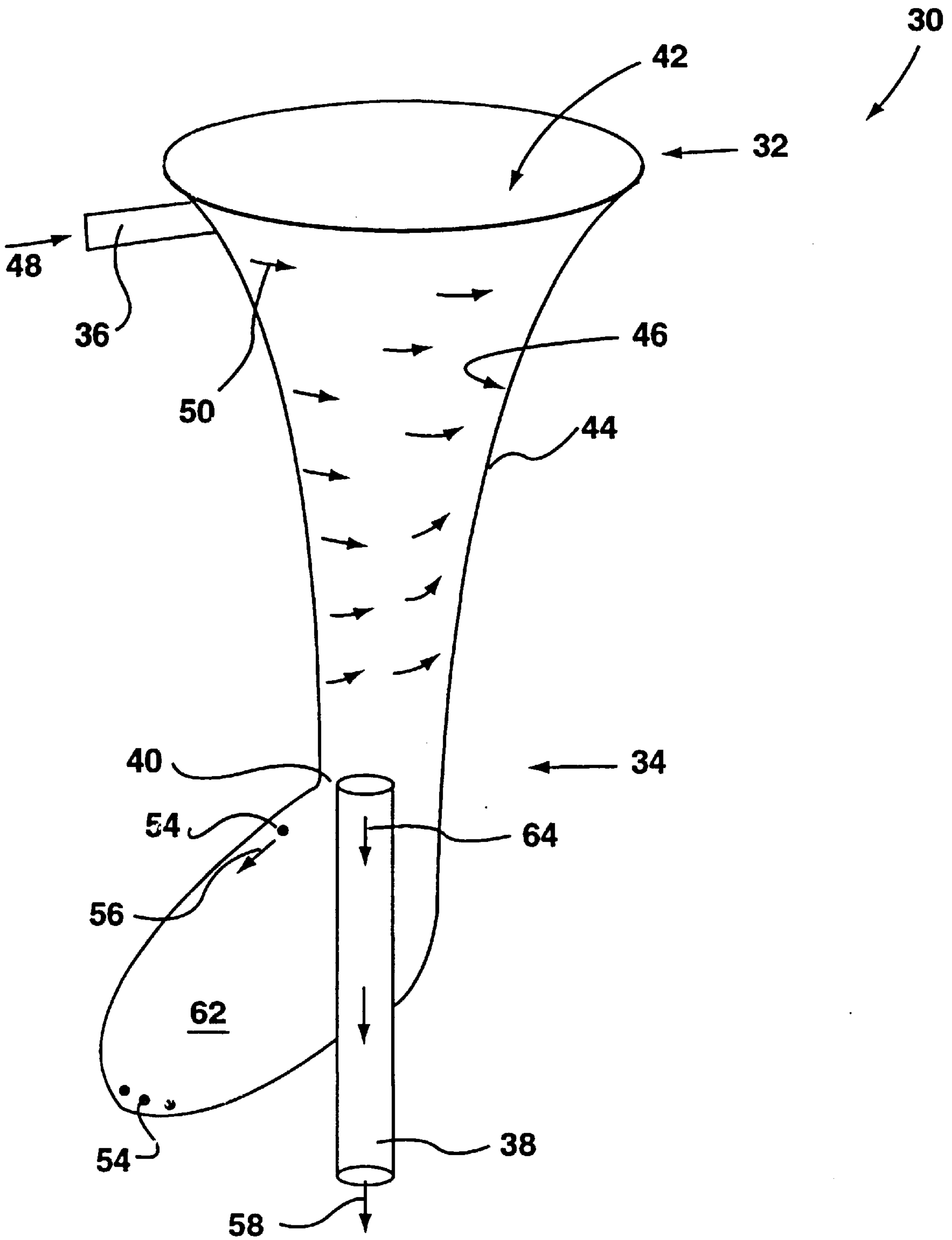
Figure 10:
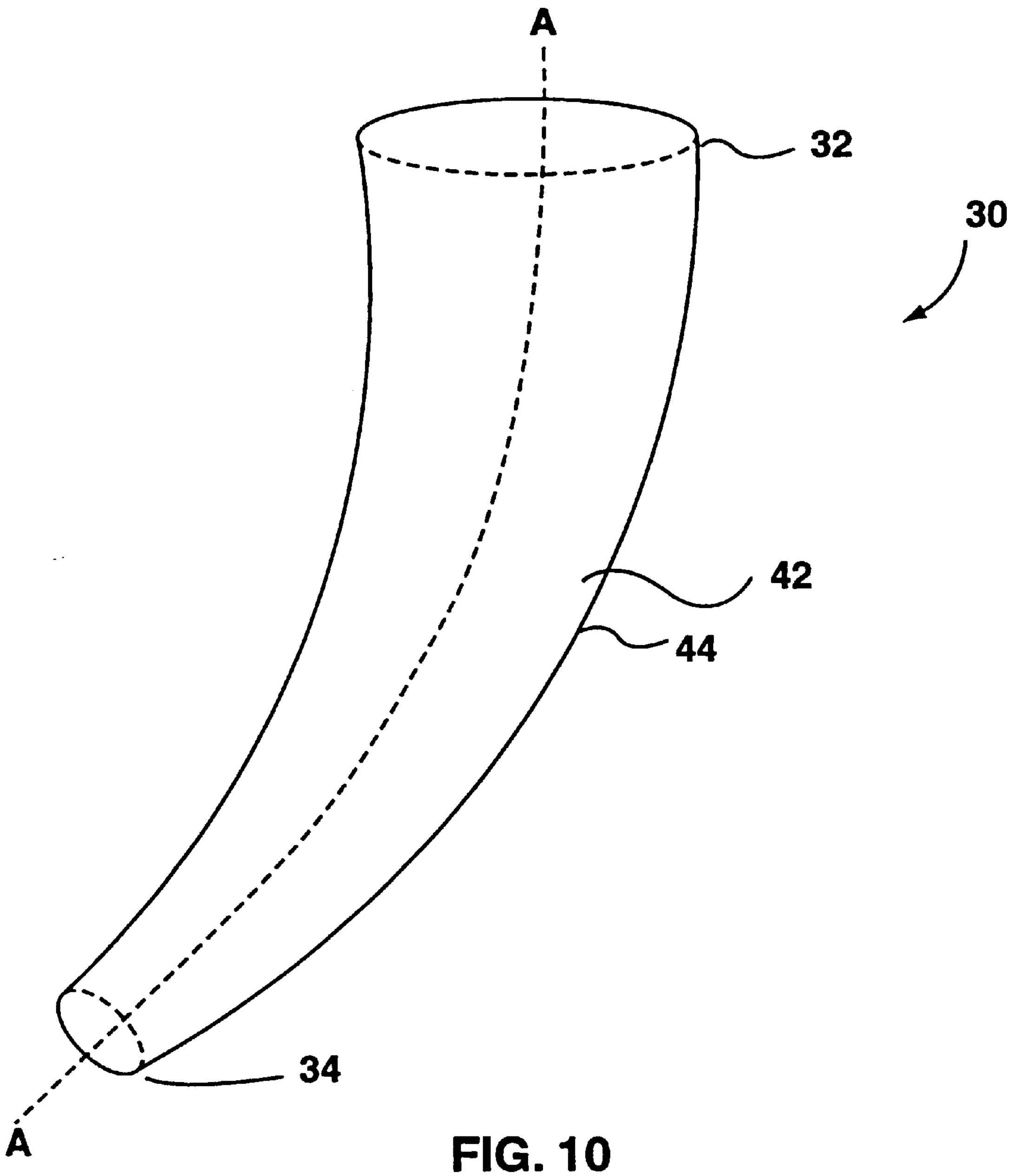

FIGS. 4(*a*)–(*c*) are examples of continuous n-differentiable curves;

FIG. 5 is a first alternate embodiment of the cyclone separator of FIG. 2;

FIG. 6 is an elevational view of the cyclone separator of FIG. 5;

FIG. 7 is a second alternate embodiment of the cyclone separator of FIG. 2;

FIG. 8 is a further alternate embodiment of the cyclone separator according to the instant invention; and, FIG. 9 is a further alternate embodiment of the cyclone separator according to the instant invention; and, FIG. 10 is a further alternate embodiment of the cyclone separator according to the-instant invention.

DESCRIPTION OF PREFERRED EMBODIMENT

As shown in FIGS. 2, 5 and 7, cyclone separator 30 comprises a longitudinally extending body having a top end 32, a bottom end 34, fluid inlet port 36, a fluid outlet port 38 and a separated material outlet 40.

Cyclone separator 30 has a wall 44 having an inner surface 46 and defining a cavity 42 therein within which the fluid rotates. Cyclone separator 30 has a longitudinally extending axis A—A which extends centrally through separator 30. Axis A—A may extend in a straight line as shown in FIG. 2 or it may be curved or serpentine as shown in FIG. 10.

As shown in FIGS. 2 and 5, cyclone separator 30 is vertically disposed with the fluid and material to be separated entering cyclone separator 30 at a position adjacent top end 32. As shown in FIG. 7, cyclone separator 30 is again vertically disposed but inverted compared to the position show in FIGS. 2 and 5. In this embodiment, fluid 48 enters cyclone separator 30 at a position adjacent bottom end 34 of the separator. It will be appreciated by those skilled in the art that provided the inlet velocity of fluid 48 is sufficient, axis A—A may be in any particular plane or orientation, such as being horizontally disposed or inclined at an angle.

Fluid 48 may comprise any fluid that has material contained therein that is capable of being removed in a cyclone separator. Fluid 48 may be a gas or a liquid. If fluid 48 is a gas, then fluid 48 may have solid particles and/or liquid particles and/or a second gas contained therein such as by being suspended, mixed or entrained therein. Alternately, if fluid 48 is a liquid, it may have solid particles and/or a second liquid and/or a gas contained therein such as by being suspended, mixed or entrained therein. It will thus be appreciated that the cyclone separator of the instant invention has numerous applications. For example, if fluid 48 is a gas and has solid particles suspended therein, then the cyclone separator may be used as the filter media in a vacuum cleaner. It may also be used as a scrubber for a smoke stack so as to remove suspended particulate matter such as fly ash therefrom. It may also be used as pollution control equipment, such as for a car, or to remove particles from an inlet gas stream which is fed to turbo machinery such as a turbine engine.

If fluid 48 is a gas and contains a liquid, then cyclone separator 30 may be used as a mist separator.

If fluid 48 is a mixture of two or more liquids, then cyclone separator 30 may be used for liquid/liquid separation. If fluid 48 is a liquid and has a gas contained therein, then cyclone separator 30 may be used for gas/liquid separation. If fluid 48 is a liquid which has solid particles contained therein, then cyclone separator 30 may be used for drinking water or waste water purification.

In the preferred embodiment shown in FIG. 2, fluid 48 enters cyclone separator through inlet port 36 and tangentially enters cavity 42. Due to the tangential entry of fluid 48 into cavity 42, fluid 48 is directed to flow in a cyclonic pattern in cavity 42 in the direction of arrows 50. Fluid 48 travels in the axial direction in cavity 42 from fluid entry port 36 to a position adjacent bottom end 34. At some point, the fluid reverses direction and flows upwardly in the direction of arrows 52 while material 54 becomes separated from fluid 48 and falls downwardly in the direction of arrows 56. Treated fluid 58, which has material 54 separated therefrom, exits cyclone separator 30 via outlet port 38 at the top end 32 of cavity 42. In the alternate embodiment shown in FIG. 9, cyclone separator 30 may be a unidirectional flow cyclone separator. The cyclone separator operates in the same manner as described above with respect to the cyclone separator 30 shown in FIG. 2 except that fluid 48 travels continuously longitudinally through cavity 42. Material 54 becomes separated from fluid 48 and falls downwardly in the direction of arrows 56. Treated fluid 64, which has material 54 separated therefrom, continues to travel downwardly and exits cyclone separator 30 via outlet port 38 at a position below bottom end 34 of cavity 42.

In order to allow cyclone separator 30 to achieve a good separation efficiency over a wider range of small particle sizes, wall 44 is configured to continuously impart changes in the rate of acceleration of the fluid as it rotates within cavity 42. By allowing fluid 48 to be subjected to continuously varying acceleration, different size particles may be separated from fluid 48 at different portions along the axial length of cyclone separator 30. For example, if the acceleration continually increases along the length of cyclone separator 30, as would be the case of FIG. 2, continuously finer particles would be separated as the fluid proceeds from the top end 32 to bottom end 34. A boundary or prandtl layer which exists along inner surface 46 of wall 44 provides a low flow or a low velocity zone within which the separated material may settle and not become re-entrained by the faster moving air rotating within cavity 42.

In one embodiment, the acceleration may continuously increase throughout the length of cyclone separator 30. In another embodiment, the acceleration may continually decrease throughout the length of cyclone separator 30. In another embodiment, such as is defined by the curve shown in FIG. 4(*b*), the acceleration may vary between continuously increasing and continuously decreasing along the length of cyclone separator 30.

In a preferred embodiment of the invention, inner surface 46 of wall 44 is defined by a continuous n-differentiable curve swept 360° around axis A—A wherein n is $\geqq 2$ and the second derivative is not zero everywhere. Preferably, n is $\geqq 2$ and $\leqq 1{,}000$, more preferably $n \leqq 100$ and most preferably $n \leqq 10$. If the second derivative is zero at a finite number of points, then it may be zero from about 2 to 100 points, preferably from about 2 to about 30 points and, more preferably, at 2 to 10 points. The path around axis A—A is closed path. The path may be any shape such as a circle, an ellipse or a polygon. For example, if a parabola is swept 360° degrees around a circular path, a paraboloid of revolution is formed.

If the second derivative is zero everywhere, then the result and curve would be a straight line thus defining either a frusto-conical shape or a cylindrical shape.

If the generating curve has both positive and negative curvatures over its domain, then at some point the curvature is zero, namely at the point were the curvature is zero. This is demonstrated by point "c" as shown in FIGS. 4(*a*) and 4(*b*).

The particular shape of the curve shown in FIG. 2 is best characterized as a trumpet shape. This shape may be generated by using a curve that does not have an inflection point or, alternately, restricting the domain of the curve such that it does not include an inflection point. Trigonometric functions, polynomials, log functions, bessel functions and the like can all be restricted to a domain where there is no inflection point. Accordingly, a trumpet-shaped surface can be generated from all of these.

By way of example, the generation of a trumpet-shaped curve may be demonstrated using a cubic curve having a general formula as follows:

$$F(a,b,c,d,x)=a.x^3+b.x^2+c.x+d$$

The curvature of F is given by the second derivative (i.e. n=2) with respect to x:

$$\frac{d^2}{dx^2}F(x) = 6\cdot a\cdot x + 2\cdot b$$

The point where curvature is zero is obtained by solving:

$$6.a.x_0+2.b=0$$

$$x_0 = \frac{-1}{3}\cdot\frac{b}{a}$$

For example, F(1, 2, 3, 4, x) has a zero curvature point at:

$$x_0 = \frac{-1}{3}\cdot\frac{b}{a} = \frac{-1}{3}\cdot\frac{2}{1} = -0.667$$

$$x_0 = -0.667$$

FIG. 4(*c*) is a plot of F(1, 2, 3, 4, x) over the domain [−4, 2]. The crosshairs identify the point of zero curvature, namely [−0.667, 2.592]. If this curve is rotated 360° around a closed circular path, it will generate two trumpet shapes which are meet at the crosshairs. If the domain is restricted to regions lying entirely to the left or entirely to the right of the inflection point, a trumpet shaped profile will be generated (e.g. taking F over the domain [−4,−1] or over the domain [0, 2]).

As fluid 48 travels downwardly through the cyclone separator shown in FIG. 2, the contained material, which for example would have a higher density then that of the fluid, would be subjected to continuously increasing acceleration and would be separated from the fluid and travel downwardly along inner surface 46 of wall 44 in the boundary or prendtl layer. As the fluid travels further downwardly through cyclone separator 30, the fluid would be accelerated still more. Thus, at an intermediate level of cyclone separator 30 of FIG. 2, fluid 48 would be travelling at an even greater rate of speed compared to the top end 32 resulting in even finer contained material becoming separated. This effect would continue as fluid 48 rotates around inner surface 46 to bottom end 34.

Referring to FIGS. 4(*a*)–(*b*), examples of other n-differential curves where an n≧2 and the second derivative is not zero everywhere are shown. It will be understood that the second derivative may be zero at a finite number of points. For example, as shown in FIG. 4(*a*), when the second derivative is zero at a finite point, there is a change in inflection of the curve such as at the point denoted "c" in the FIGS. 4(*a*) and (*b*). As shown in FIG. 4(*b*), the curve may have a second derivative which is zero at three finite points creating 3 inflection points. These inflection points vary the diameter of cavity 42 thus causing fluid 48 to accelerate and/or decelerate as it passes longitudinally through cavity 42.

Increasing the diameter of cavity 42 decelerates the fluid. The contained material, which has a different density to the fluid would therefore change velocity at a different rate than the fluid. For example, if the contained material comprised particles which had a higher density, they would decelerate at a slower rate then fluid 48 and would therefore become separated from fluid 48. At the narrower portions of cavity 42, fluid 48 would accelerate. Once again, the denser particles would be slower to change speed and would be travelling at a slower rate of speed than fluid 48 as fluid 48 enters the narrower portion of cavity 42 thus again separating the solid particles from fluid 48. It would be appreciated that if the particles where less dense then fluid 48, they would also be separated by this configuration of inner surface 46 of cavity 42.

If fluid 48 comprises a mixture of two fluids which are to be separated, it is particularly advantageous to include in cavity 42 at least one portion which is configured to decrease the rate of acceleration of fluid 48 as it passes through that portion of the separator. In this configuration, the less dense fluid would decrease its velocity to follow the contours of inner wall 46 more rapidly then the denser fluid (which would have a higher density), thus assisting in separating the less dense fluid from the more dense fluid.

As shown in FIG. 5, fluid 48 may enter cavity 42 axially. In such a case, fluid entry port 36 is provided, for example, at top end 32 of cyclone separator 30. A plurality of vanes 60 are provided to cause fluid 48 to flow or commence rotation within cavity 42. It would be appreciated by those skilled in the art that fluid 48 may enter cavity 48 from any particular angle provided that fluid entry port 36 directs fluid 48 to commence rotating within cavity 42 so as to assist in initiating or to fully initiate, the cyclonic/swirling motion of fluid 48 within cavity 42.

Referring to FIG. 7, cyclone separator 30 is vertically disposed with fluid entry port 36 positioned adjacent bottom end 34. As fluid 48 enters cavity 42, it rises upwardly and is subjected to a continuously varying acceleration along inner surface 46 of cavity 42. Gravity will tend to maintain the contained material (if it is heavier) in the acceleration region longer thereby enhancing the collection efficiency. At some point, the air reverses direction and flows downwardly in the direction of arrow 64 through exit port 38. Particles 54 become separated and fall downwardly to bottom end 34 of cyclone separator 30. If bottom end 34 is a contiguous surface, then the particles will accumulate in the bottom of cyclone separator 30. Alternately, an opening 40 may be provided in the bottom surface of cyclone separator 30 so as to permit particles 54 to exit cyclone separator 30.

It would be appreciated that in one embodiment, cyclone separator 30 comprises an inner surface 46 all of which is configured to continuously impart changes on the rate of acceleration of the fluid as it rotates within cavity 42. Alternately, only a portion of inner wall 46 of cyclone separator 30 may be so configured. It will also be appreciated that cyclone separator 30 may have a portion thereof which is designed to accumulate separated material (for example, if the bottom surface of the cyclone separator FIG. 7 were sealed) or, the bottom of cyclone separator 30 of FIG. 5 may have a storage chamber 62 (which is shown and dotted outline) extend downwardly from outlet 40. Alternately, outlet 40 may be in fluid communication with a storage chamber 62. For example, as shown in FIG. 2, storage chamber 62 is positioned at the bottom of and surrounds outlet 40 so as to be in fluid communication with cyclone separator 30. Collection chamber 62 may be of any particular configuration to store separated material 54 (see FIG. 5) and/or to provide a passage by which separated material 54 is transported from cyclone separator 30 (see FIG. 2) provided it does not interfere with the rotational flow of fluid 48 in cavity 42.

In the longitudinal direction defined by axis A—A, inner surface 46 is continuous. By this term, it is meant that, while inner surface 46 may change direction longitudinally, it does so gradually so as not to interrupt the rotational movement of fluid 48 within cavity 42. It will be appreciated that inner surface 46 of cavity 42 may be defined by a plurality of straight line portions, each of which extend longitudinally for a finite length. Inner surface 46 may be defined by 3 or more (see FIG. 8) such segments 66, preferably 5 or more such segments and most preferably, 10 or more such segments.

It will also be appreciated that, depending upon the degree of material which is required and the composition of the material in the fluid to be treated that a plurality of cyclone separators may be connected in series. The plurality of separators may be positioned side by side or nested (one inside the other).

What is claimed is:

1. A cyclone separator for separating dirt from an air stream via a cyclone generated therein, the cyclone separator comprising: a first wider end having a larger cross sectional area than a second narrower end, a dirty air inlet, an interior and a cleaned-air exit, the second narrower end is positioned above the first wider end, the dirty air inlet is positioned adjacent the first wider end and the cleaned air exit comprises a passageway extending through a portion of the cyclone, wherein the cyclone is configured such that separated dirt travels downwardly through the cyclone towards the wider end exterior of the passageway.

2. The cyclone separator as claimed in claim 1 further comprising a separated dirt storage chamber positioned to receive dirt separated from the air stream as the air stream passes through the cyclone separator wherein the passage has an entrance that is positioned above the separated dirt storage chamber.

3. The cyclone separator as claimed in claim 1, wherein the cleaned-air exit has an inward extending rim for collecting the dirt.

4. A cyclone separator for separating dirt from an air stream via a cyclone generated therein, the cyclone separator comprising: a first wider end having a larger cross sectional area than a second narrower end, a dirty air inlet, an interior and a cleaned-air exit, the second narrower end is positioned above the first wider end, the dirty air inlet is positioned adjacent the first wider end and the cleaned air exit comprises a straight passageway extending through a substantial portion of the cyclone.

5. The cyclone separator as claimed in claim 4 further comprising a separated dirt storage chamber positioned to receive dirt separated from the air stream as the air stream passes through the cyclone separator wherein the straight passageway has an entrance that is positioned above the separated dirt storage chamber.

* * * * *